United States Patent Office 3,178,326
Patented Apr. 13, 1965

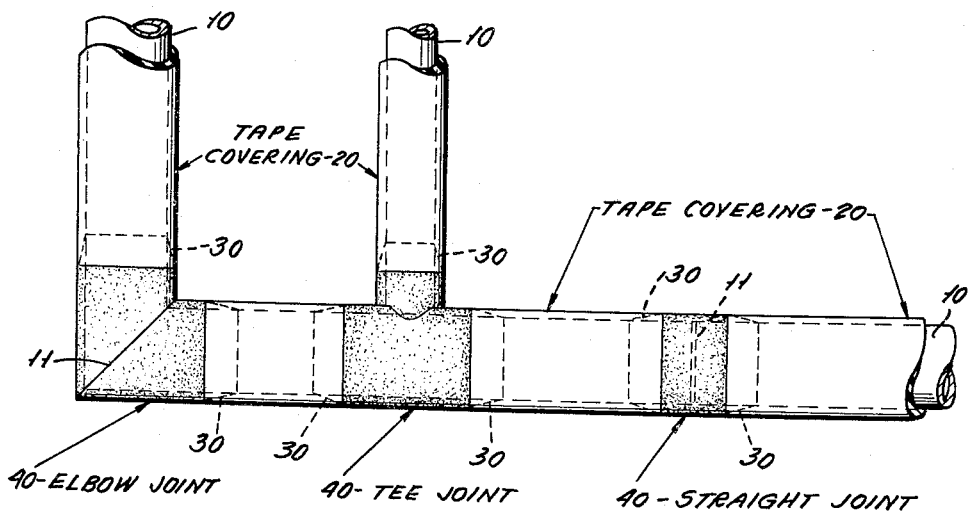
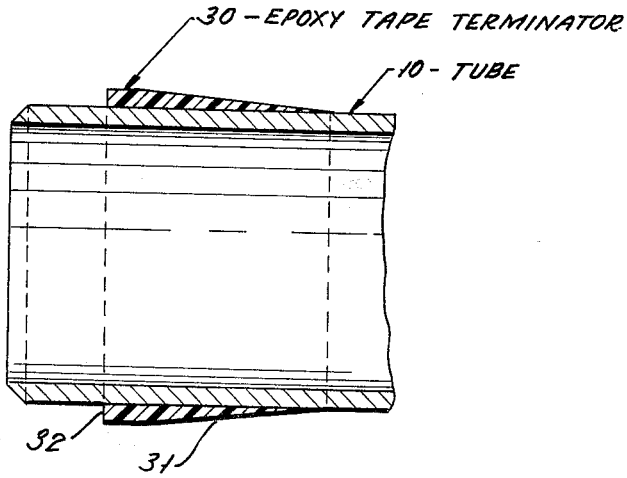

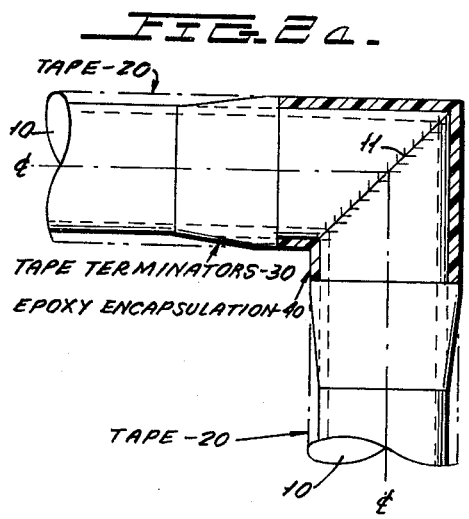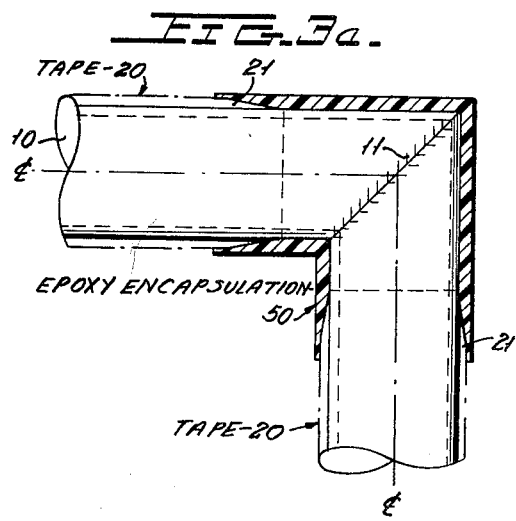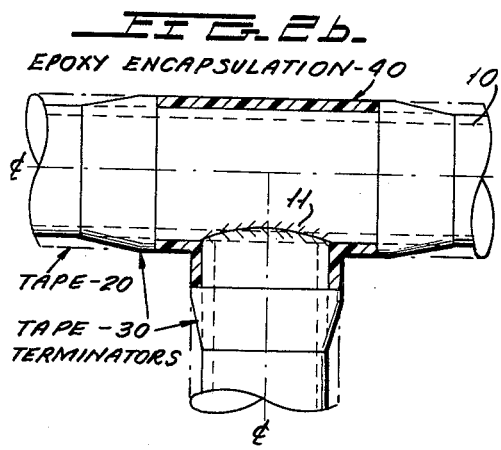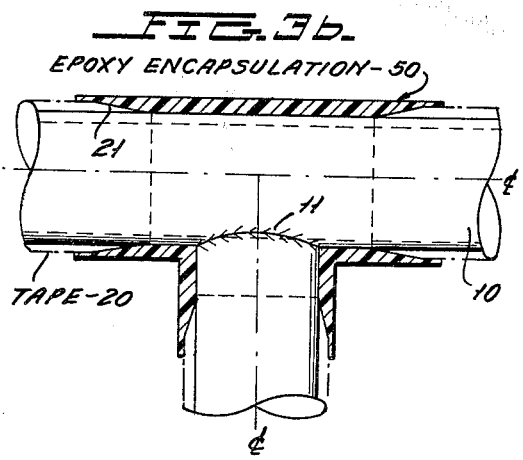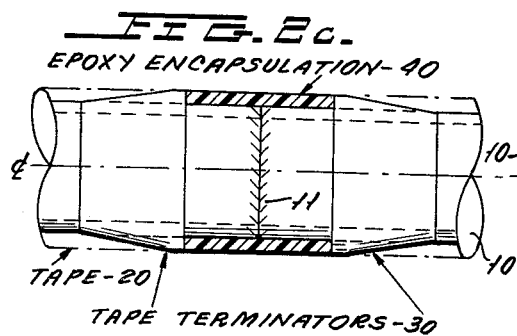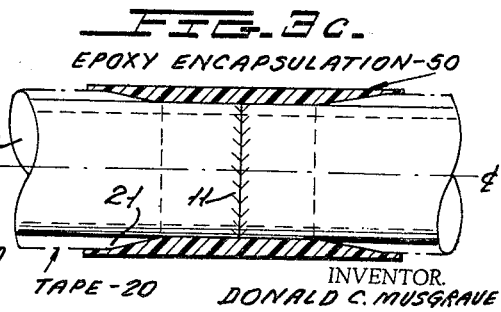
INVENTOR.
DONALD C. MUSGRAVE
BY
OSTROLENK, FABER, GERB & SOFFEN
ATTORNEYS

3,178,326
METHOD OF INSULATING BUS BAR JOINTS
Donald C. Musgrave, Greensburg, Pa., assignor to I-T-E Circuit Breaker Company, Philadelphia, Pa., a corporation of Pennsylvania
Filed Nov. 21, 1962, Ser. No. 239,211
1 Claim. (Cl. 156—49)

My invention relates to insulating means for bus bars and, more particularly, is directed to a novel arrangement whereby the complete outer surface of the bus bar can be provided with insulation with a minimum of expense and a maximum amount of desirable electrical characteristics.

Isolated phase bus, used in the electrical industry, is illustrated in U.S. Patent 2,861,119, issued on November 18, 1958, entitled "Closed Cycle Forced Cooled Isolated Phase Bus," and U.S. Patent 2,953,623, issued September 20, 1960, entitled "Forced Convection Cooling for Isolated Phase Bus," and both assigned to the assignee of the instant application.

The isolated phase bus systems are generally designed to carry currents in the many thousands of amperes and many thousands of volts and, thus, it is necessary to provide adequate insulation. Generally, the bus bars are supported on porcelain insulators to physically separate them from the metal housings. Some users of metal enclosed isolated phase electrical bus also desire that the bus bars be covered with an outer layer of insulating material. This covering of insulating material serves to provide a secondary insulation to supplement the primary porcelain insulation, and further it functions as a deterrent to excessive arc damage to the bus structure in the event of electrical flash-over within the metallic bus enclosures.

In the prior art, the outer insulating covering for the bus bar consists of multiple layers of varnished cambric or other suitable tape. In order to be completely effective in its function, the secondary insulating system must be continuous over the entire length of the bus bars in the bus run. However, in the manufacturing of such a system there is a considerable problem of providing continuous insulation at various bus connections, elbows, angle turns, T tapes, as well as other connections which necessarily result in irregular surface projections and relatively sharp corners.

My present invention provides a novel arrangement whereby all of the advantages of a secondary insulation are retained without any of the disadvantages associated therewith and does so by a reasonable simple solution to the problem.

The basic concept of my invention is to provide the necessary continuous secondary insulation system with a first and second insulation in which the first insulation is a molded epoxy insulation covering the irregular shaped locations, and the second insulation is the usual tape covering the straight smooth conductor sections only. The junction of the tape and epoxy results in a gradual transition from the first insulation to the second insulation by having these two insulation means overlap so that the electrical puncture strength is maintained throughout the bus run.

Furthermore, my novel arrangement lends itself to fabrication methods wherein all taping of conductor sections can be applied to the bus conductor in advance of their being brazed or welded into irregular shaped units.

Generally, irregularly shaped bus bar joints have to be made with brazed or welded fittings and designed to have generous corner radii and smooth external surfaces to facilitate the tape wrappings. However, this prior art design is quite expensive to produce because of the added tools and extra machining costs. However, with my novel arrangement, the external surface does not have to be smooth at the points of brazing or welding since tape is not used at the irregular sections but instead an epoxy insulation is used at these points.

Furthermore, in prior art constructions the joints of irregular shape with projecting surfaces have had to be equipped with metallic shields with large corner radii and smooth external surface. In these arrangements, the tape is applied over the outside area of the shields but the shields are a costly addition to the insulation system. With my novel arrangement of providing a first insulation of a cast molded insulation and a second insulation of tape insulation the shields are eliminated.

Furthermore, prior structures of irregularly shaped joints have been covered with clamped-on phenolic jackets with metallized interiors to prevent corona formation inside. However, these units are costly in cases of conductor joints of special size and design and, furthermore, there is no bonding of the insulation joints to insure full puncture strength of the system. However, my novel secondary insulation system eliminates the need for clamped-on jackets and is as easily applied to regular configurations as it is to irregular configurations.

Accordingly, a primary object of my invention is to provide an insulation system with a first and second insulation which overlap one another to provide a gradual transition from the first insulation to the second insulation.

Another object of my invention is to provide a continuous secondary insulation for irregularly shaped conductors which precludes the necessity of producing such shapes with large radii about the corners so that the tape wrapping may be applied continuously without producing wrinkled areas or resulting in air voids within the wrappings.

My novel insulation system is especially useful in the fabrication of insulated aluminum conductors where it is desirable to allow welded beads to project above the external surface of the finished joint for reasons of joint strength and decreased electrical resistance.

Another object of my invention permits the taping of all individual conductor sections prior to their being joined to form irregular units. This is especially useful when automatic or semi-automatic taping can be used only on units of straight lengths.

Furthermore, my novel insulation system lends itself to conductor joints to be made in the field during installation of a bus structure as well as in the fabricator's factory's facilities. In either instance, there is a substantial cost reduction over the methods used in the prior art.

These and other objects of my invention will be apparent from the following description when taken in connection with the drawings, in which:

FIGURE 1 is a view of the typical irregularly shaped isolated phase bus illustrating an elbow, T and straight joint having a secondary insulation system in accordance with a first embodiment of my invention.

FIGURE 2 is an enlarged cross-sectional view of a portion of the bus bar illustrating the configuration of the epoxy tape terminals applied to the bus bar in the first-embodiment of my invention.

FIGURES 2a, 2b, and 2c are enlarged side views (with molded encapsulation in cross-sectional view), respectively, of an elbow joint, a T joint and a straight joint, such as illustrated in FIGURE 1 and each illustrate the first embodiment of my invention.

FIGURES 3a, 3b and 3c are enlarge cross-sectional views, respectively, of an elbow joint, a T joint and a straight joint and each illustrate the second embodiment of my invention.

FIGURE 1 illustrates a typical irregularly shaped phase of an isolated phase bus run which would include a welded elbow joint, a welded T joint, and a welded straight joint wherein it can be seen that the straight portion of the hollow cylindrical conductor or bus bar 10 is provided with epoxy tape terminators 30 adjacent the irregularly shaped sections.

FIGURE 2 is an enlarged cross-sectional view of a portion of the conductor 10 prior to the time that the cast molded encapsulating epoxy insulation 40 is applied to the system. In the views of FIGURES 1 and 2, it will be noted that the epoxy tape terminator 30 is located immediately adjacent to the joint or splice and, as specifically shown in detail in FIGURE 2, the epoxy tape terminator 30 is provided with a conical shape 31 in the area in which it overlaps with the tape 20 so as to insure a gradual transition from the epoxy insulation 30 to the tape insulation 20. The terminator 30 can be pre-cast and cemented to the conductor 10 or it can be molded directly on to the conductor tube 10 in advance of the application of the tape 20 and the makeup of the various conductor joints.

After the assembly of the necessary epoxy tape terminators 30, as seen in FIGURE 2, to the various sections of the conductor 10, as seen in FIGURE 1, each of the conductors 10 is then wrapped with insulating tape 20 along its straight portions. Preferably, the epoxy tape terminator 30 has a thickness slightly in excess of the tape covering so that suitable molds can be clamped in place without interfering with tape surface.

As successive layers of tape 20 are applied, each is arranged to overlap the conical shaped ends 31 of the terminator 30 in order to provide an adequate increased path to resist electrical puncture at the gradual transition juncture of tape 20 and epoxy terminator 30. The conductor sections are joined by welding or brazing 11 after the tape wrapping 20 is completed on all of the individual pieces.

After all of the conductor sections are properly connected, the exposed surfaces of the conductor 10 and the shoulders of the tape terminator 30 are cleaned with trichlorethylene prior to the time that they are encapsulated with epoxy. Thereafter, suitable molds are placed over the various joints. The molds are arranged to clamp over the short cyclindrically exposed portion of the associated epoxy tape terminators 30. The cavity thus created between the inner walls of the mold and the outer irregular surface of the conductor joint and the straight ends 32 of the tape terminators 30 is poured full with a suitable epoxy resin formulated for adequate dielectric strength and thereafter allowed to cure in place. The mold is removed and the external surfaces of the molded epoxy encapsulation 40 are cleaned with trichlorethylene. The bonded-on epoxy encapsulation 40 thus provides complete, continuous insulation over the irregular conductor joint and between the terminations of the tape wrappings 20.

Thus, I have provided a novel secondary insulation system in which all of the straight portions have the standard tape insulation terminated by a precast or molded terminator 30 so that all of the irregular shapes of the bus conductor can be properly encapsulated with an opexy resin to thereby provide a continuous secondary insulation system regardless of the configuration of the bus conductor.

It is furthermore noted that with my novel invention, the tape covering 20 can be removed at any time without upsetting the epoxy tape terminators 30 or the epoxy encapsulation 40.

In view of the overlap between the tape 20 and the epoxy tape terminator 30, there is a gradual transition from a first insulation to a second insulation so that the electrical puncture strength is maintained throughout the entire bus run.

The first embodiment of my invention seen and described above in connection with FIGURES 2, 2a, 2b and 2c is particularly useful in connection with arrangements wherein it may be desirable to subsequently remove the tape covering 20. However, if future removal of the tape insulation 20 in the immediate vicinity of the conductor joints is not anticipated, the epoxy tape terminators 30 on the conductors 10 may be completely omitted. The second embodiment of my invention is best illustrated for the various types of joined sections in FIGURES 3a, 3b and 3c for elbows, T and straight joints, respectively.

It is noted that in this second embodiment, the tape 20 is first applied to all of the straight sections of the conductor 10 and thereafter the various conductors are welded or brazed together at 11 to form the irregular shapes such as seen in FIGURES 3a, 3b and 3c. The tape covering 20 includes a conical pencilling 21 facing in the direction of each conductor joint. After the joint is brazed or welded at 11, the exposed surfaces of the conductor 10 and the exposed pencilling surface 21 is cleaned with trichlorethylene before the joint is encapsulated with an epoxy 50. A suitable method, in the manner described in connection with the embodiments of FIGURES 2a, 2b and 2c for the molding of epoxy encapsulation 40, is designed to permit full overlap of the epoxy 50 over the tape pencillings 21. The mold is clamped over the straight cylindrical portions of the tape 20 and the joint is encapsulated by the epoxy 50 by pouring the mold full. When the mold is stripped from the cured pour, the exposed external surface of the epoxy 50 is cleaned with trichlorethylene. Thus, the net result is a continuous secondary insulation over the straight and irregular portion of the conductor 10.

Thus, both embodiments 1 and 2 provide for at least a first and second insulation which partially overlap to provide a gradual transition between the insulations. Furthermore, my novel invention permits the taping of all the individual conductors prior to their being joined to form irregular units thus lending itself to the utilization of either automatic or semi-automatic taping devices. Furthermore, the insulation system of my invention can be done either in the field or at the factory and in either instance results in a substantial reduction in cost over the prior secondary insulation systems in use.

Although I have described preferred embodiments of my novel invention, many variations and modifications will now be obvious to those skilled in the art, and I prefer therefore to be limited not by the specific disclosure herein but only by the appended claim.

The embodiments of the invention in which an exclusive privilege or property is claimed are defined as follows:

The method of making an insulation system for bus bars comprising the steps of cast molding terminators near the ends and on the outer surface of a first and second bus bar in which the terminators have a conical shape at one end; thereafter applying insulation tape on the outer surface of the first and second bus bar such that the insulation tape overlaps the conical shape of the terminators; thereafter joining the first and second bus bars to each other; and thereafter applying a molded encapsulation between terminators of different bus bars to cover the area where the bus bars are joined.

References Cited by the Examiner

UNITED STATES PATENTS

| | | | |
|---|---|---|---|
| 2,402,451 | 6/46 | Scott et al. | 174—84 |
| 2,925,459 | 2/60 | Priaroggia | 174—73 |
| 3,017,306 | 1/62 | Priaroggia | 174—84 |

JOHN F. BURNS, *Primary Examiner.*

JOHN P. WILDMAN, *Examiner.*